United States Patent [19]
Rouch et al.

[11] Patent Number: 5,170,103

[45] Date of Patent: Dec. 8, 1992

[54] ACTIVE VIBRATION CONTROL DEVICE

[75] Inventors: Keith E. Rouch, Versailles; Sanjiv Tewani; Bruce L. Walcott, both of Lexington, all of Ky.; Ted R. Massa, Latrobe, Pa.; Robert W. Stephenson, Columbus, Ga.; L. Scott Stephens, Baton Rouge, La.

[73] Assignee: University of Kentucky Research Foundation, Lexington, Ky.

[21] Appl. No.: 702,987

[22] Filed: May 20, 1991

[51] Int. Cl.$^5$ .............................................. B23B 47/00
[52] U.S. Cl. ..................................... 318/128; 408/143; 409/141; 82/158
[58] Field of Search ....................... 318/128; 408/143; 82/137, 158, 163, 118; 409/141

[56] References Cited

U.S. PATENT DOCUMENTS

| | | | |
|---|---|---|---|
| 4,104,920 | 8/1978 | Albert et al. | 73/517 |
| 4,365,181 | 12/1982 | Yamamoto | 310/320 |
| 4,553,884 | 11/1985 | Fitzgerald et al. | 408/143 |
| 4,565,940 | 1/1986 | Hubbard, Jr. | 310/326 |
| 4,583,912 | 4/1986 | Ball et al. | 415/119 |
| 4,615,504 | 10/1986 | Sandercock | 248/550 |
| 4,620,121 | 10/1986 | Mishiro | 310/323 |
| 4,713,770 | 12/1987 | Hayes et al. | 364/474 |
| 4,721,447 | 1/1988 | Erckmann | 425/141 |
| 4,741,231 | 5/1988 | Patterson et al. | 82/2 B |
| 4,799,472 | 1/1989 | Tonshoff et al. | 125/11 R |
| 4,842,450 | 6/1989 | Donovan et al. | 408/1 R |

FOREIGN PATENT DOCUMENTS

| | | | |
|---|---|---|---|
| 0273992 | 12/1989 | German Democratic Rep. | 409/141 |
| 0289644 | 11/1989 | Japan | 409/141 |

OTHER PUBLICATIONS

Publication entitled "Active Optimal Vibration Control Using Dynamic Absorber", Authors: S. G. Tewani, B. L. Walcott and K. E. Rouch, dated Jun. 29, 1990, pp. 1–17.

Publication entitled "control of Machining Chatter by Use of Active Elements", Authors: S. G. Tewani, L. S. Stephens and K. E. Rouch, 1988 Symposium of Advanced Manufacturing, Sep. 26-28, 1988, pp. 31–36.

Primary Examiner—Steven L. Stephan
Assistant Examiner—Judson H. Jones
Attorney, Agent, or Firm—James G. Porcelli

[57] ABSTRACT

An active vibration control device for controlling vibration in a cantilevered member and a method for the same are disclosed. The device is comprised of a cantilevered member having a longitudinal axis comprising a sensor mounted near the free end of the member to measure motion of the member in a transverse direction and to produce a corresponding signal. A force generating assembly is mounted to the member near the free end to oppose the measured motion with a force thereby minimizing subsequent motion along the transverse axis caused by vibration.

48 Claims, 7 Drawing Sheets

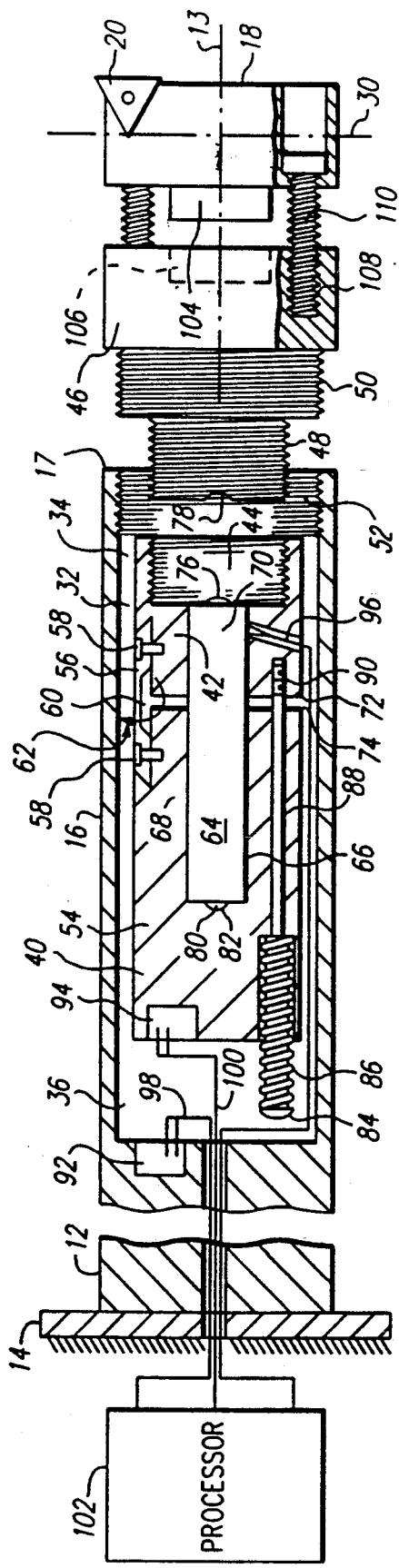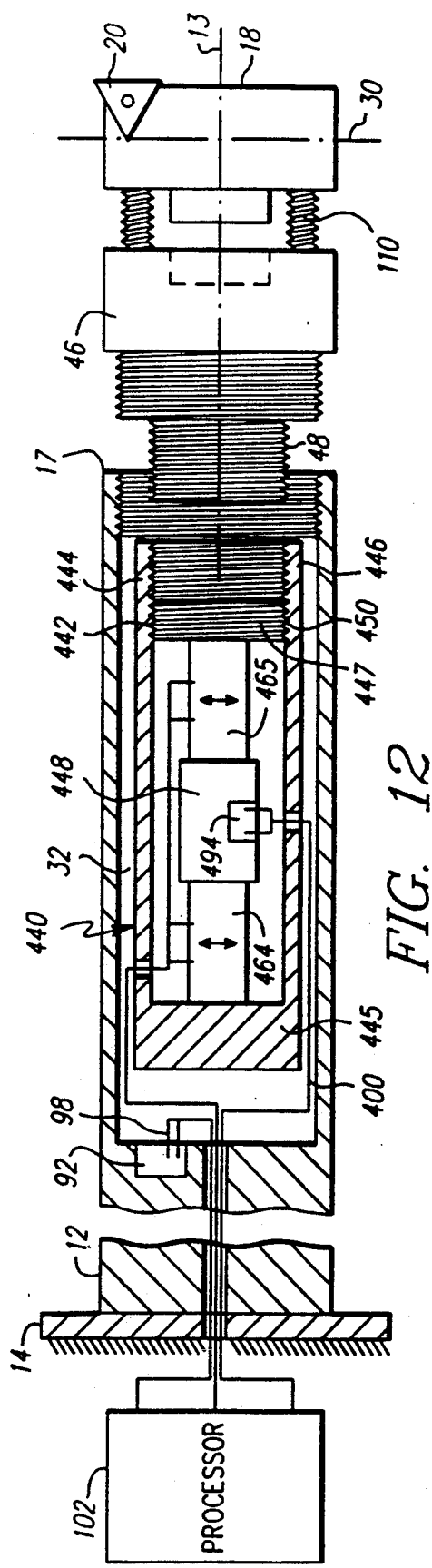
FIG. 2
FIG. 12

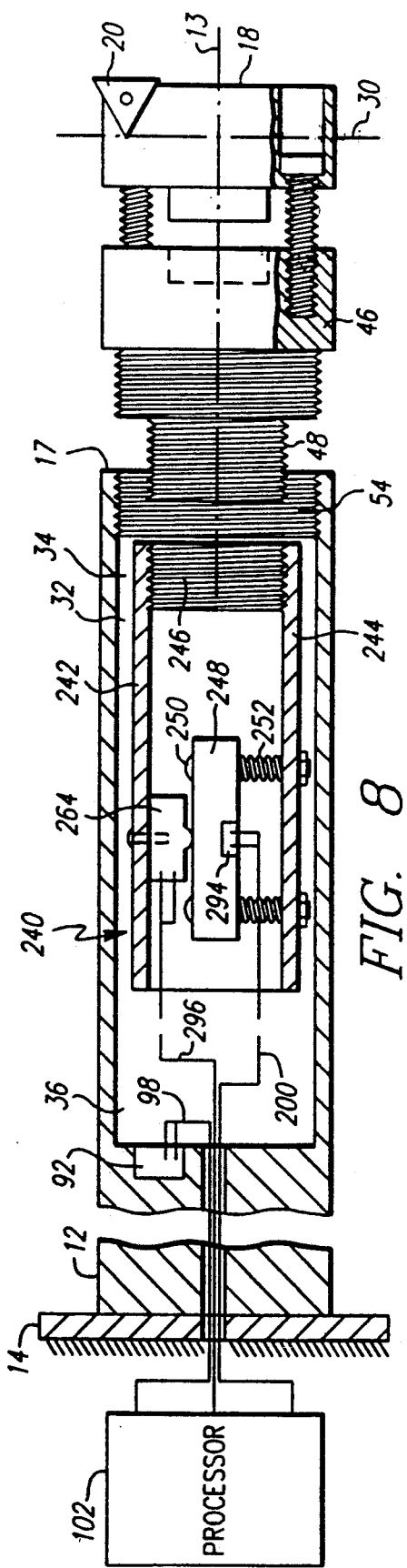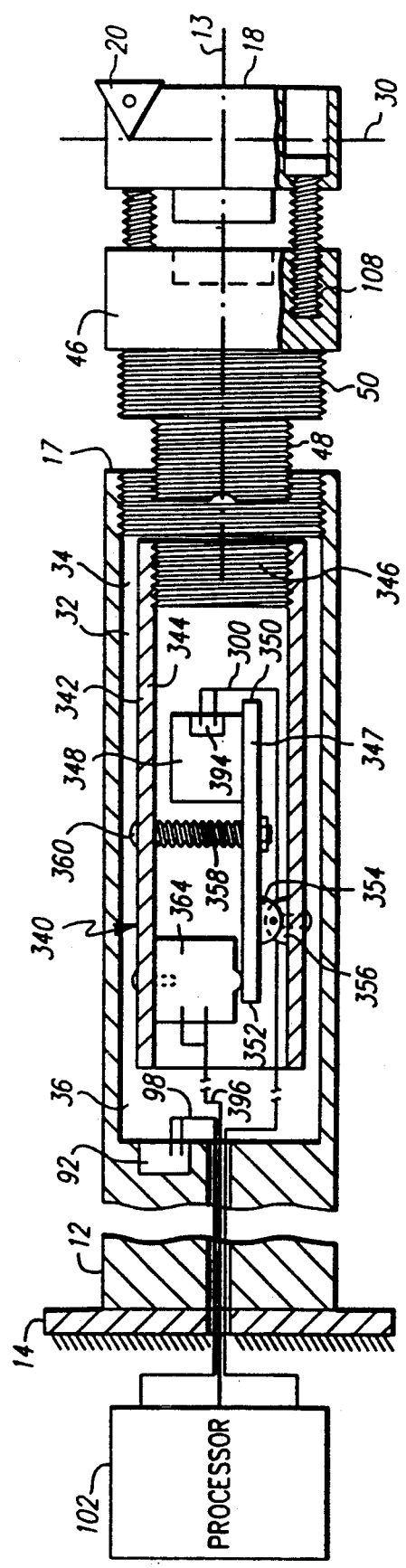

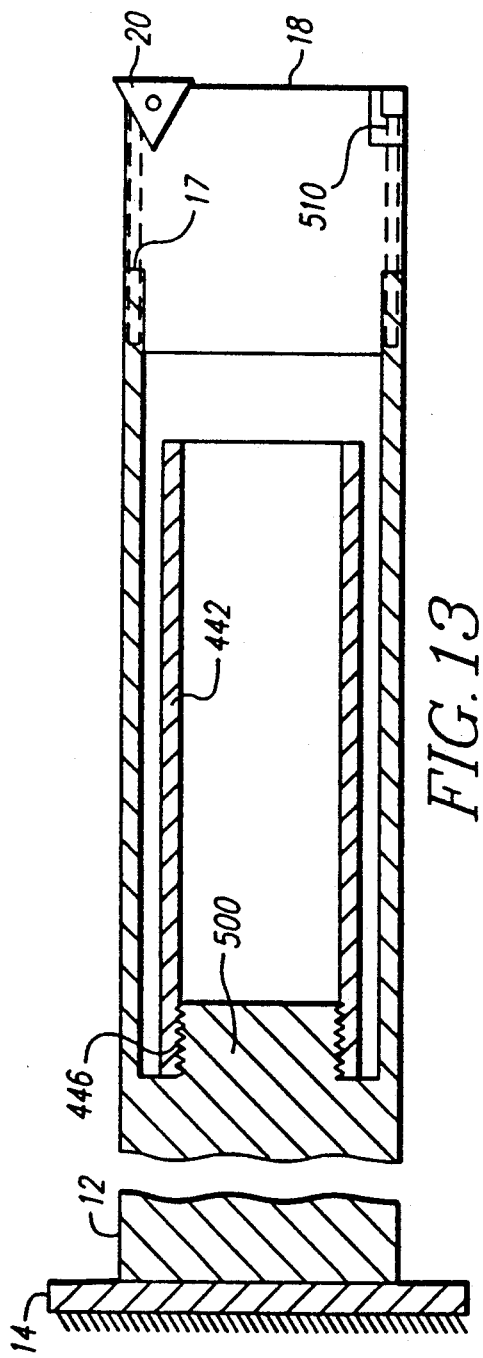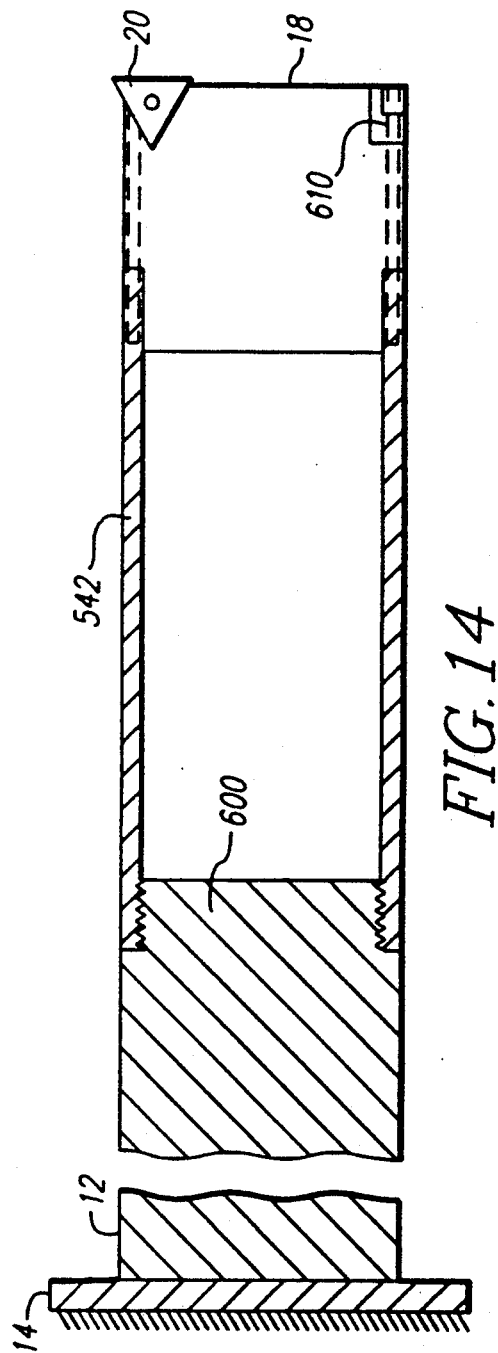

ACTIVE VIBRATION CONTROL DEVICE

BACKGROUND OF THE INVENTION

This invention relates to an apparatus and method for an active vibration control device and, more particularly, to such an apparatus and method adapted to reduce vibration in a machine tool member.

Excessive vibrations frequently called "chatter" between the cutting element of a machine tool and the surface of the workpiece cause poor surface finish, tool breakage and other undesired effects that have long plagued machining operations. Such vibrations arise especially when the tool includes a long unsupported length that will permit deflection of the tool. When chatter does occur the machining parameters must be changed and as a result productivity may be adversely affected.

When using the stiffest and most advanced machine tool design, there still remains vibration in the machine tool. For example, a long cantilevered boring bar with a single cutting element at its free end will, by its interaction with the workpiece, tend to vibrate.

This vibration may be considered to be self-excited because it is generated by the interaction of the cutting element and the workpiece. Such self-excited vibration occurs at frequencies near the natural frequency of the cantilevered tool and, therefore, tends to increase in amplitude under small disturbing forces.

While the amplitude will generally be greatest at the free end of the tool, the pattern of vibration, such as the spacing of the nodes and the kind of harmonics generated, may vary widely under different conditions and from one point along a workpiece to another. It will be understood the "vibration" as employed herein does not refer to simple deflection or yielding of the tool which may be brought about simply by large static forces developed thereon, but refers to vibrations or oscillations which tend to be maintained or increased when energized by a selectively small oscillation in the disturbing force. Such a disturbing force usually corresponds to a resonant condition.

It is among the general objects of this invention to provide an active vibration control device that will substantially reduce or eliminate chatter and vibration, especially of the self-excited type, in machine tool members.

Another object is to provide an improved active vibration control device that will be effective over a wide range of frequencies.

Another object is to provide an improved active vibration control device that will oppose motion in a vibrating member by inertial changes of an inertial element.

Another object is to provide an improved active vibration control device in the form of a convenient package that will be effective in a wide variety of applications and have advantages not found in existing devices.

Still another object is to provide a method of actively controlling vibration which is more effective than previously known methods.

SUMMARY OF THE INVENTION

The invention provides an apparatus for actively controlling vibration in a cantilevered member having a longitudinal axis comprising a sensor mounted near the free end of the member to measure motion of the member in a transverse direction and to produce a corresponding signal. A force generating assembly is mounted to the member near the free end to oppose the measured motion with a force thereby minimizing subsequent motion along the transverse axis caused by vibration.

The force generating assembly is comprised of a solid mass attached to the member near the free end and displaceable from an initial position such that when displaced the resulting acceleration of the mass generates a force upon the member, an actuator to act upon and displace the mass from the initial position, means for receiving and interpreting the sensor signal and activating the actuator to displace the mass at an acceleration which is a function of the sensor signal, and means for returning the mass toward the initial position.

In one embodiment of the invention, the member has a longitudinal bore therein with a forward and rearward portion and the mass is movably attached to the member through a base secured within the bore to the member. A hinge with a pivot having an axis perpendicular to the plane defined by the intersection of the transverse axis and the longitudinal axis connects the mass to the base and positions the mass within the bore.

In a second embodiment of the invention, the member includes a sleeve having a wall and the mass is slidingly mounted within the sleeve for movement along the transverse axis.

In a third embodiment of the invention, the member includes a sleeve having a wall and the mass is movably attached to the sleeve. A lever with a short length end and a long length end on each side of a fulcrum is pivotally attached at the fulcrum of the lever to the sleeve wall. The mass is secured to the long length end of the lever such that a small displacement at the short length end will result in a magnified displacement at the long length end.

In a fourth embodiment of the invention, the member includes a sleeve having a wall and the mass is movably attached to the sleeve and at least one double acting transverse actuator is mounted along the longitudinal axis to the sleeve such that said actuator when activated by a voltage causes the mass to be displaced along the transverse axis. This generates an acceleration and associated force and when activated by an opposite voltage causes the mass to be displaced in an opposite direction.

Finally the invention provides a method for actively controlling vibration in a cantilevered member having a longitudinal axis comprising the steps of sensing motion in a transverse direction near the free end of the member and producing a corresponding signal and generating a force along the transverse axis near the free end to oppose the measured motion. Generating a force comprises the steps of attaching a mass to the member near the free end, said mass being displaceable along the transverse axis from an initial position such that when displaced the resulting acceleration of the mass generates a force upon the member, receiving and interpreting the corresponding signal, displacing the mass a desired amount at a desired rate, and returning the mass toward the initial position.

BRIEF DESCRIPTION OF THE DRAWINGS

The above, as well as other features and advantages of the invention will become apparent through consideration of the detailed description in connection with the drawings in which:

FIG. 2 is a partial cutaway view of the first embodiment of the invention showing a force generating assembly which utilizes a hinged mechanism.

FIG. 8 is a partial cutaway view of the second embodiment of the invention showing a force generating assembly utilizing an actuator oriented in the transverse direction.

FIG. 10 is a partial cutaway view of the third embodiment of the invention showing a force generating assembly utilizing an actuator oriented in the transverse direction.

FIG. 12 is a partial cutaway view of the fourth embodiment of the invention showing a force generating assembly utilizing an actuator oriented in the longitudinal direction but capable of displacement in the transverse direction.

FIG. 13 is a partial cut away view of an embodiment illustrating the sleeve attached to the member in another manner.

FIG. 14 is a partial cut away view of an embodiment illustrating the sleeve attached to the member in still another manner.

DETAILED DESCRIPTION OF THE INVENTION

Figure 1:
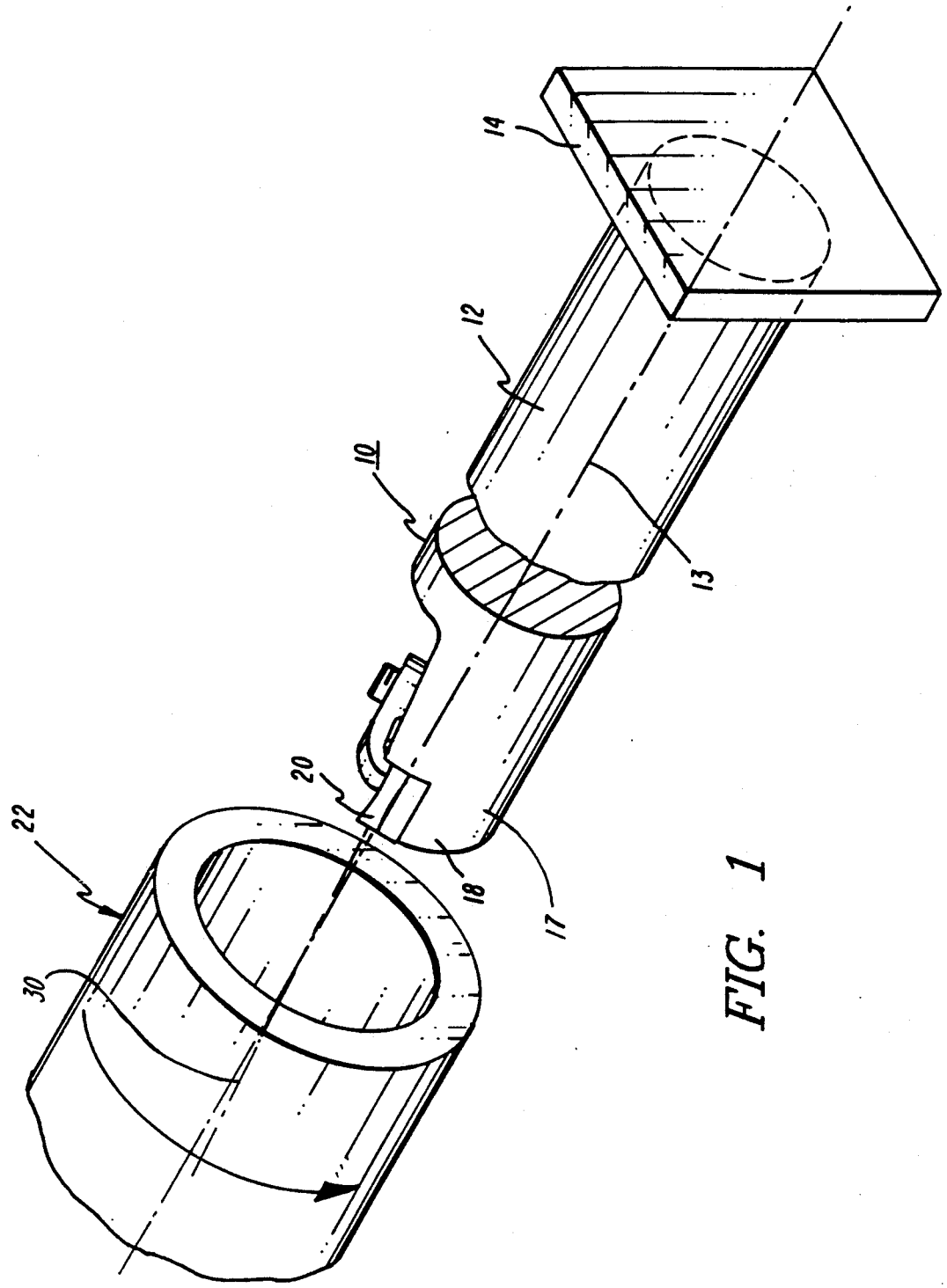
FIG. 1 is an isometric of a general arrangement showing a machine tool in position to operate on a workpiece.

Referring to FIG. 1, a machine tool 10 includes a cantilevered or overhanging member 12, having a longitudinal axis 13, which is mounted in a conventional holder 14. The free end 17 of member 12 is provided with a tool head 18 on which is mounted a cutting element 20. When a cantilevered tool of this type is used to machine a workpiece 22, it is especially subject to vibration caused by oscillating interaction forces between the cutting element 20 and the surface of the workpiece 22. Such vibration, when it occurs, tends to be near the natural frequency of the bar and to be greatest at the free end of the bar 10.

It should be noted that the length of the member 12 is typically much greater than that shown in FIG. 1. While the broken line implies this, it should be appreciated that a typical cantilevered member may have a length between four to twelve or more times greater than the thickness of the member. Because of this, any references to a location near the free end when describing a location on the member indicates a position on the longitudinal half of the member 12 toward the free end 17.

While this description generally addresses a machine tool 10 arrangement, this invention should not be limited to only this application, and it should be understood that this invention may be applied to any situation in which external forces act upon a cantilevered member thereby exciting the member near its natural frequency and thereby causing excessive and undesirable amplitudes at the free end of the member.

Such examples may include a boring bar in which vibration is caused by the oscillating interaction forces between a cutting element mounted at the free end of the bar and a workpiece, a vertical turning lathe in which vibration is caused by the oscillating interaction forces between a cutting element mounted at the free end of the lathe ram and a workpiece and a horizontal boring mill in which vibration is caused by the oscillating interaction forces between a cutting element mounted at the free end of the mill ram and a workpiece.

The active vibration control device of this invention utilizes a movable mass attached near the free end of the member 12 such that when the motion of the member is sensed, a control signal is generated and transmitted to an actuator which displaces the movable mass to generate an inertial force. This inertial force reacts on the member and opposes the motion of the member thereby reducing the vibration.

It has been found that during the cutting operation, the primary direction of motion caused by chatter is approximately within a plane parallel to the cutting tool defined by the intersection of the longitudinal axis 13 and an axis 30 transverse, as shown in FIG. 1. It should be noted, however, that this transverse axis 30, while always perpendicular to the longitudinal axis 13, may be slightly rotated about the longitudinal axis 13 from the orientation shown in FIG. 1. This may be caused by, among other things, the shape of the cutting tool relative to the member 12. Because of this motion, the inertia force to oppose the motion should occur in the same plane as the motion.

One actuator to displace the movable mass and generate the inertial force to oppose the motion of the member in the current invention may be a piezoelectric device. This type of a device is known by those skilled in the art and is comprised of a series of piezoelectric elements aligned along a single axis such that upon the application of a voltage and a current, the elements expand a given amount at a given rate. It should be noted that piezoelectric devices have limited stroke and force capability and, as such, some sort of mechanical amplification may be needed to increase stroke effectiveness. This is especially important when the actuator is installed in a confined space since the piezoelectric device stroke is proportional to the actuator length.

Other actuators that may be used to displace the movable mass and generate the inertial force are a DC linear brushless motor, an electronic solenoid, a motorized screw mechanism, a hydraulic cylinder or a pneumatic cylinder which upon application of input signals, provide linear displacement. With this in mind, the first embodiment of the invention may be discussed.

Just as in FIG. 1, FIG. 2 shows a cantilevered member 12 having a longitudinal axis 13 and attached to a conventional holder 14. The member 12 extends to a free end 17. A tool head 18 is attached to the free end 17 and a cutting tool 20 is attached to the tool head 18. A transverse axis 30 is also shown relative to the cutting element 20.

A longitudinal bore 32 extends within the member 12 and has a forward portion 34 at the free end 17 of the member and a rearward portion 36. A force generating assembly 40 may be disposed within the longitudinal bore 32 of the member 12 and it is this assembly that will generate inertial forces to oppose the motion caused by the contact of the cutting element 20 with a workpiece (not shown). The force generating assembly 40 may be secured within the bore 32 and, as such, the assembly 40 has a base 42 which, as will be described, is secured to the member 12. While the following description will show how the assembly 40 may be attached to the free end 17 of the member 12, the assembly may be secured to the member 12, as will be shown, at the other end of bore 32. Alternately the member 12 need not have a bore and the assembly may be attached to the free end 17 of the member 12 as an extension of the member 12.

An adaptor 46 has a threaded first diameter 48 and a threaded second diameter 50. The base 42 of the assembly 40 has a threaded portion 44 to receive the threaded first diameter 48 of the adaptor 46. After the base 42 is secured to the adaptor 46, the adaptor 46 may then be secured at the forward portion 34 of the bore 32 by engaging the threaded second diameter 50 of the adaptor 46 with a bore threaded portion 52 of the member 12. In this manner the force generating assembly 40 is held securely within the bore 32 through use of the adaptor 46.

The force generating assembly 40 is comprised of the base 42 and a solid mass 54 attached to the base 42 by a hinge 56 of elastic material, which may as an example be a steel alloy operating within the elastic range of the steel. The hinge 56 may be secured to the base 42 and the solid mass 54 using conventional methods. Screws 58 engaging the base 42 and the solid mass 54 are illustrated for this purpose. The hinge 56 provides a pivot point 60 about which the solid mass 54 may rotate. This rotation is illustrated by arrow 62. The rotation about the pivot point 60 by the solid mass 54 preferably defines a plane which is parallel to that plane defined by the intersection of the longitudinal axis 13 and the transverse axis 30.

The rotation of the mass 54 about the hinge 56 occurs in a reciprocating motion. In order to displace the mass 54 away from the base 42, an actuator 64 is utilized. The actuator 64 is a member which, by longitudinal expansion, displaces the mass 54 such that it rotates about the pivot point 60. The actuator 64 is contained within an actuator chamber 66. The actuator chamber 66 is comprised of a mass chamber portion 68 and a base chamber portion 70. The hinge 56 pivotally connects the base 42 with the mass 54 thereby establishing two approximately adjacent surfaces, which are the base end surface 72 and the mass end surface 74. The base chamber portion 70 extends from the base end surface 72 through the base 42 along the longitudinal axis 13 until it is contacted by the adaptor 46. The mass chamber portion 68 extends from the mass end surface 74 along the longitudinal axis 13. For improved efficiency, since the actuator 64 provides linear expansion and the mass 54 is capable of only rotational movement, the actuator 64 has an actuator nub 76 and an actuator nub 80, which contact a nub receiving surface 78 in the adaptor 46 and a nub receiving surface 82, respectively, in the mass 54. In such a manner, for small angles, the actuator 64 will uniformly contact the mass 54 and the adaptor 46.

While the actuator 64 is capable of displacing the mass 54 from an initial position in a specific direction, once it displaces the mass 54 and is retracted, a means for returning the mass to a position in which it once again contacts the actuator 64 is required.

One such means is comprised of a spring-loaded bolt 84, having a spring 86 which is urged against the mass 54 extending through the mass 54 via bore 88 to a threaded bore 90 within the base 42. Utilizing such a design the spring-loaded bolt 84 may be advanced or retreated from the base 42 thereby increasing or decreasing the force exerted by the spring 86 on the mass 54 and increasing or decreasing the time required to return the mass 54 toward the base 42.

In order to properly control the force generating assembly 40 and the actuator 64, it is necessary to know the motion of the member 12 near the free end 17. As mentioned earlier, it is preferable to know the plane in which the largest motion occurs. A motion sensor 92 is mounted within the member 12 toward the free end 17 to measure motion within this plane. Furthermore, it is desirable but not imperative to monitor the motion of the mass 54. To this end a motion sensor 94 is attached to the mass 54.

Preferably the sensors 92 and 94 can be accelerometers however it is possible for other devices which measure displacement or velocity to be utilized. One such example of a device for measuring displacement would be an eddy current sensor. The purpose of the sensor 94 is to monitor the acceleration of the mass 54. Under certain circumstances it may be necessary to monitor only the acceleration of member 12 and as such utilize only sensor 92. This may be possible when the natural frequency of the member 12 is relatively low.

Given the information provided by at least the motion sensor 92 on the member 12, it is possible to selectively activate the actuator 64 to actively control the vibration within the member 12. It should be noted that, preferably, both motion sensor 92 and motion sensor 94 measure motion in the same plane in which the mass 54 rotates; that is a plane indicated by the intersection of the longitudinal axis 13 and the transverse axis 30.

This sensor information is sent to a processor 102, which will be described later, for receiving and interpreting the sensor signals and a signal is then sent to actuate the actuator 64. These signals may be sent to the actuator 64 and received from the sensor 92 and the sensor 94 via wires 96, 98 and 100 respectively.

The tool head 18 may be aligned using alignment stub 104 in the tool head 18 and the receiving bore 106 in the adaptor 46 and secured to the adaptor 46 utilizing screws 110 extending from the tool head 18 through threaded bores 108 within the adaptor 46.

Figure 3:
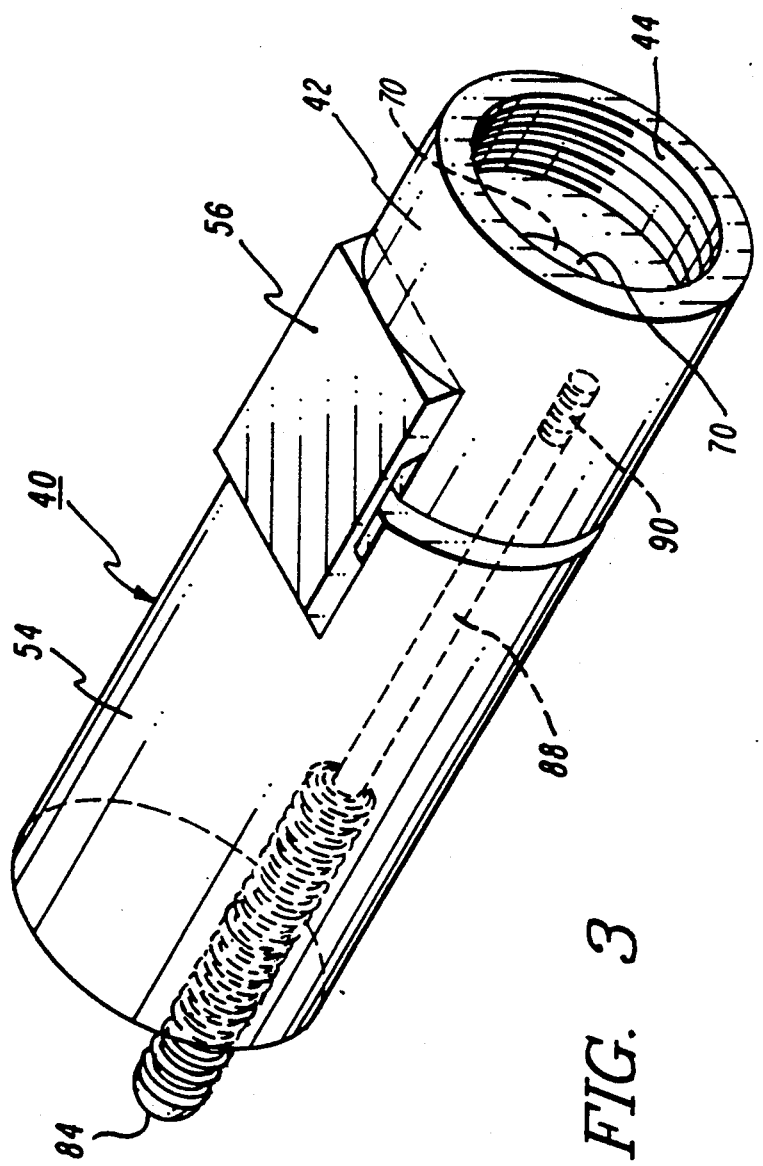
FIG. 3 is an isometric view of the force generating assembly of FIG. 2.

FIG. 3 shows an isometric of the force generating assembly 40 with numbers identifying items similar to those found in FIG. 2. Note that for simplicity, sensor 94 and actuator 64 have not been shown in FIG. 3.

Figure 4:
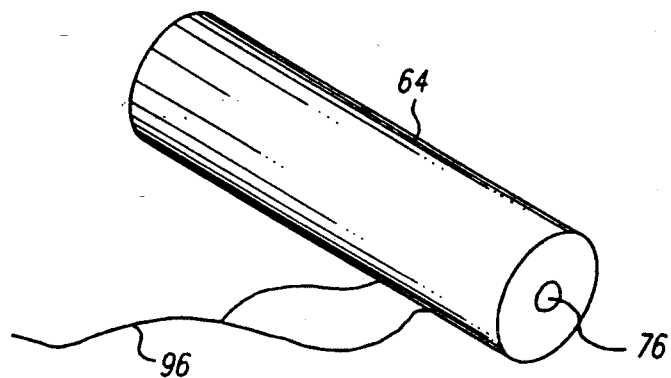
FIG. 4 is an isometric view of the actuator shown in FIG. 2.

FIG. 4 shows an isometric of an actuator 64 having nub 76 and wires 96. The actuator 64 may be comprised of a series of piezoelectric elements aligned along a longitudinal axis in series such that when a current is provided through the wires 96 the piezoelectric elements (not shown) expand thereby lengthening the overall actuator 64. Such a device is commercially available from the Physik International Company and identified as Model No. P242.01.

For the arrangement shown in FIGS. 2 and 3, a prototype was constructed in which the member 12 is a cylinder having an outer diameter of 2 inches and an overall length of approximately 3 feet. The mass 54 weighs approximately 2 pounds and the actuator 64, comprised of a piezoelectric device having piezoelectric elements, is capable of longitudinal expansion of about 0.001 inches utilizing 1000 volts at 5 milliamps. Given these parameters, the mass 54 may be displaced and an inertial force along the transverse axis 13 of about 12 pounds when moving the mass 54 at 200 cycles per second may be generated. The actuator 64 is capable of cycling at a rate of 1000 cycles per second and the spring constant of the springs 86 is sized such that mass 54 is capable of returning within such a frequency. Specifically, the spring rate of spring 86 is about 500 pounds per inch.

The actuator 64, instead of being a piezoelectric device, may be a DC linear brushless motor, or DC actuator, however by its nature, such a device cannot generate force as great as a series of piezoelectric elements but can provide a greater amount of displacement to the mass 54. For that reason under certain circumstances a DC actuator may be substituted for a the piezoelectric elements currently comprising the actuator 64. Such an arrangement would be more conducive to a member 12 of a significant size and length such that the natural frequency would be relatively low and the response required from the actuator could be slower.

Just as a DC actuator could be utilized, so could an electronic solenoid, a motorized screw mechanism, a hydraulic cylinder or a pneumatic cylinder, however, just as before, such use may be limited to a member 12 having a significant size and length such that the natural frequency of the member 12 is relatively low.

Figure 5:
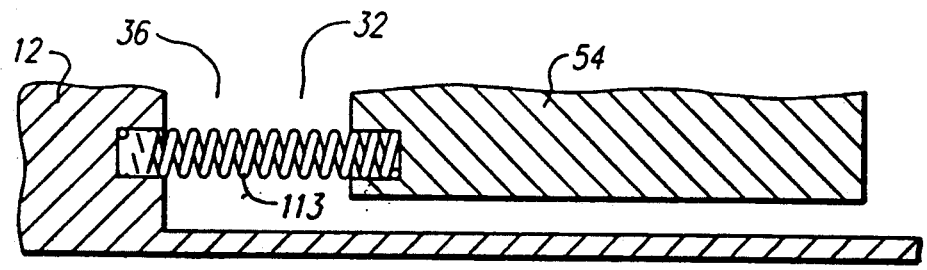
FIG. 5 is a portion of FIG. 2 showing an alternate design for returning the mass toward the initial position.
Figure 6:
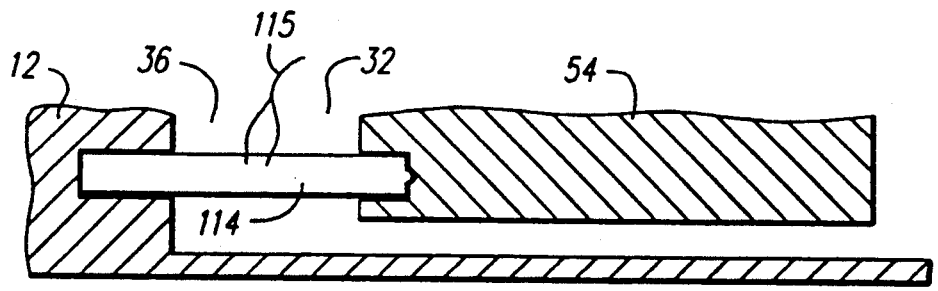
FIG. 6 is a portion of FIG. 2 showing an alternate design for returning the mass toward the initial position.

The spring-loaded bolt 84 extending through the mass 54 and the base 42 may be substituted by a spring 113 in FIG. 5 extending from the member 12 at the rearward portion 36 of the bore 32 and contacting that portion of the mass 54 currently penetrated by the bolt 84 (FIG. 3). In yet another alternative, the spring-loaded bolt 84 may be substituted by a return actuator 114 (FIG. 6) mounted between the member 12 at the rearward portion 36 of the bore 32 and the mass 54 such that upon actuation, the actuator would expand in a manner similar to that of actuator 64 (FIG. 3), however, in the opposite direction such that the mass 54 would be returned toward the initial position in contact with the actuator 64. Wires 115 extend from actuator 114 for control. In a retracted position the return actuator 114 would permit movement of the mass 54 by actuator 64 (not shown).

The embodiment shown in FIGS. 2-6 is not drawn to scale and it should be pointed out that the thickness of the member 12 at the bore 32 and the tightness of the threaded connections are such that the overall vibration characteristics of the member 12 are not significantly affected. Furthermore, member 12 is of a sufficient length that a sensor mounted at the bore rearward portion 36 will provide an accurate indicator of the motion at the member free end 17.

With the design shown in FIGS. 2-6, and the other embodiments to be discussed, it is possible to automatically determine the natural frequency of the member 12/mass 54 system. The natural frequency is one of the vibrational characteristics utilized in controlling vibration within the member 12. This may be done by momentarily exciting the actuator 64 to intentionally induce vibration withinthe member 12. Sensor 92 may then be utilized to provide information for calculating the natural frequency.

Additionally, while threaded connections are shown among the member 12, base 42, and adaptor 46, it is entirely possible to secure these elements by brazing, screwed connections or other conventional techniques. One advantage of the current threaded arrangement is that the force generating assembly 40 may be rotated about longitudinal axis 13 to align the plane of movement of mass 54 with the plane of motion. This may be necessary if the initial orientation of the plane of movement of the mass is different than the plane of motion. The assembly 40 (FIG. 2) may be rotated using a spacer (not shown) between the base 42 and the adaptor 46 such that when threaded together, the assembly 40 tightens to the adapter 46 at a different angle about longitudinal axis 30.

Given motion data provided from sensor 92 on the member 12 and optionally sensor 94 on the mass 54 along with the ability to activate.actuator 64 it is necessary to apply vibration control theory for operation of this device.

The specific relationship between the vibration of the member and the control signal to be generated is a mathematical relationship based on vibration control theory. Generally, the control of a lumped mass system, is posed as a Linear Quadratic Regulator (LQR) problem. The steady state feedback parameters for the system are readily calculated for such a system from a state variable model.

Such a system involves a main mass, M, and a secondary mass, m. The main mass, M, is attached to the ground through a spring of stiffness, K1. The secondary mass, m, is connected to the main mass system through an actuator. Such an arrangement of an active force generating element and a secondary mass can act as a dynamic absorber by providing inertia to oppose the motion of the main mass. In this discussion for convenience the main mass will be referred to as the member 12 and the secondary mass will be referred to as the mass 54.

The dynamic equations for such a system are given as:

$$M(d2x) = -K1x + F1 - F2 \tag{1}$$

$$m(d2y) = F2 \tag{2}$$

where x denotes the displacement of the member 12 along the transverse axis, y denotes the displacement of the mass 54 along the transverse axis, F1 denotes the cutting force applied to the member 12 along the transverse axis, F2 denotes the force given by the actuator, such as a piezoelectric device, d2x denotes the acceleration of the member 12 along the transverse axis and d2y denotes the acceleration of the mass 54 along the transverse axis.

Note that controlling the force given by the piezoelectric device can change the opposing force acting on the mass. This can be used to change the amplitude of vibration of the main mass.

The main objective of such an arrangement is to control the amplitude of forced vibrations of the member and thereby alter the dynamic characteristics of the member/mass system. By varying the voltage input to the piezoelectric device, the amplitude of vibration of the main mass can be controlled. Therefore, a performance index is defined which takes into consideration not only the state variables but also the input voltage.

Figure 7:
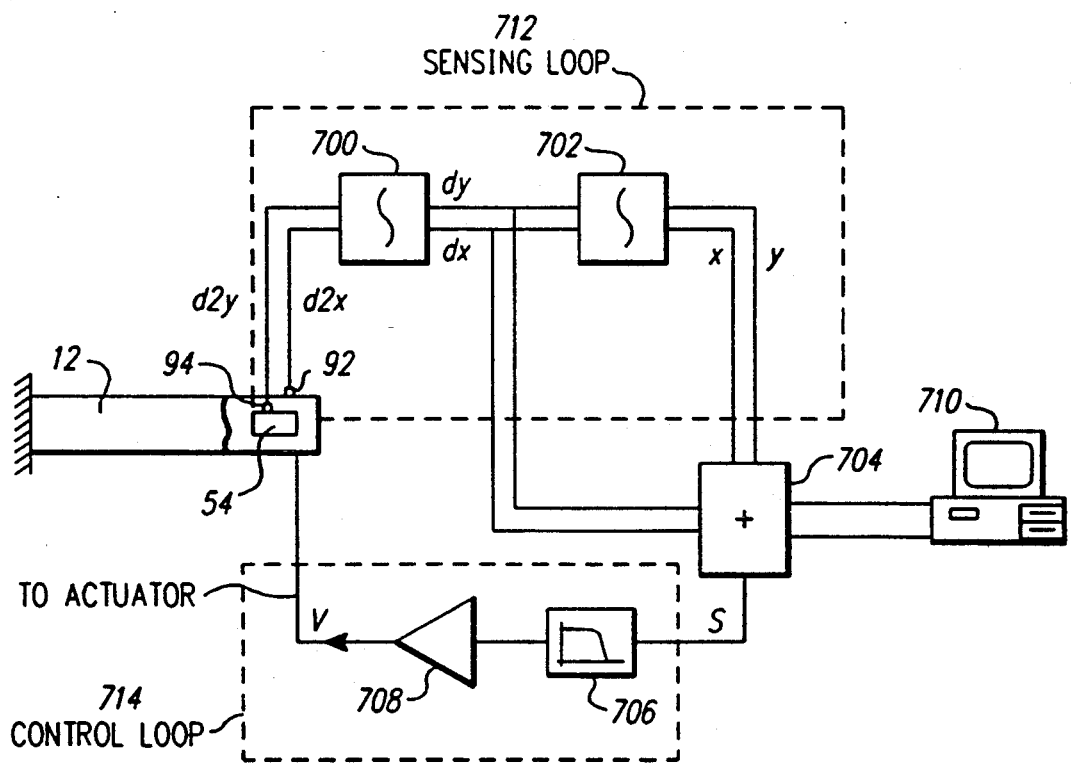
FIG. 7 is a schematic drawing showing the signal processing utilized with the invention.

FIG. 7 shows a schematic of the operation of the force generating assembly. Two sensors, for example accelerometers 92 and 94, are contained in the system.

One accelerometer 92 is mounted to the member 12 and the second accelerometer 94 is mounted to the mass 54. Both accelerometers are located to sense acceleration along the transverse axis (30 in FIG. 2). Each accelerometer produces an electrical charge proportional to the acceleration of the member and the mass respectively. These signals are shown as d2x and d2y in FIG. 7. Each signal is then sent through an integrator 700 to produce signals dx and dy. These two signals are directly proportional to the velocity of the member 12 and the mass 54 respectively. Each of these signals is then fed through an additional integrator 702 producing the signals x and y, respectively. x and y are representative of the displacement of the member 12 and mass 54, respectively, along the transverse axis. The four signals dx, dy, x and y are then scaled by coefficients C1, C2, C3 and C4 (not shown) and combined 704 using theory discussed earlier. These coefficients are selected to minimize the total weighted energy of the member/mass system. In addition a computational device such as computer 710 may be utilized for this step. This produces a voltage signal S as shown in FIG. 7. The signal S is then sent through a low pass filter 706 for noise reduction and then the signal is sent through a piezoelectric amplifier 708 resulting in the signal V which is then applied to the piezoelectric device in the member 12. This signal V produces a displacement in the actuator. The processor 102 provided in the discussion of FIG. 3 includes the sensing loop 712 and the control loop 714 and may include the computational device 710, shown in FIG. 7. The other embodiments of this invention to be discussed will utilize processors similar to this arrangement.

While FIGS. 2-6 have shown an embodiment of this invention utilizing a pivoting hinge, other alternative embodiments exist. The primary difference of each of these alternative embodiments is the details of the force generating assembly 40. The member 12, adaptor 46 and cutting head 18 may all remain as described in FIGS. 2-6.

FIG. 8 shows one such alternative embodiment of the invention in which the mass is directly displaced in the transverse direction, thereby permitting all of its motion to effectively oppose motion of the member along transverse axis 30. For convenience, items which have not changed from the previous embodiment will be identified using the same items numbers previously used. The description of this alternate embodiment will be primarily focused on the differences of the force generating assembly.

Just as before, a member 12 (FIG. 8) having a longitudinal axis 13 is secured at one end by a member holder 14. Within the member 12 is a bore 32 having a bore forward portion 34 close to the free end 17 of the member 12 and also having a bore rearward portion 36. An adaptor 46 is secured to the member 12 at the free end 17 and a tool head 18 may be secured to the adaptor 46. A cutting insert 20 is connected to the tool head 18.

The force generating assembly 240 shown in FIG. 8 is different than the force generating assembly 40 shown in FIGS. 2-6. Specifically the assembly 240 is comprised of a sleeve 242 having sleeve walls 244 and furthermore having a sleeve threaded portion 246 at one end of the sleeve. This sleeve threaded portion 246 engages with the threaded first diameter 48 of the adaptor 46 to secure the sleeve 242 to the adaptor 46 within the bore 32. A solid mass 248 is slidingly mounted within the sleeve 242 along the transverse axis 30 such that expansion of the actuator 264 displaces the mass 248 along the transverse axis 30.

The mass 248 may be guided by at least one screw 250 extending through a bore larger than the screw 250 diameter in the mass 248 and secured to the sleeve wall 244. The actuator 264 displaces the mass 248 in one direction, however to return the mass 248 toward its initial position after the actuator 264 has been deactivated, a spring 252 may be placed between the mass 248 and the sleeve wall 244. As shown in FIG. 8 a screw 250 and the spring 252 may be used in conjunction with one another.

Figure 9:
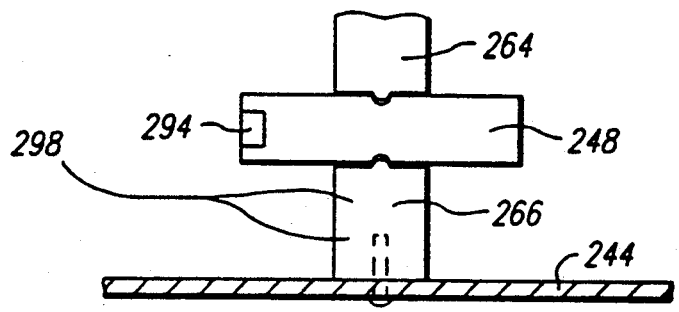
FIG. 9 is a portion of FIG. 8 showing an alternate design for of returning the mass toward the initial position.

Just as before, the means for returning the mass toward the initial position is not limited to the spring-loaded screws shown in FIG. 8. Other arrangements may include securing the spring 252 directly to the mass 248 and the sleeve wall 244, thereby eliminating the need for the screw 250. Furthermore, in place of the screw 250 or the spring 252, a return actuator 266 (FIG. 9) comprised of a cluster of piezoelectric elements similar to those used for actuator 264, may be positioned between the mass 248 and the sleeve wall 244 opposite the actuator 264, thereby providing a displacement opposite to that of the actuator 264. As illustrated, the mass 294 may be positioned in a different location on the mass 248 for this arrangement.

Just as before, signals from the mass sensor 294 (FIG. 8) and the member sensor 92 may be sent along wires 200 and 98 respectively, to a processor 102 and the actuator 264 and return actuator 266, if included, may be activated through a return signal through wires 296 and 298 respectively. Because the actuator 264 is mounted along the transverse axis 30 in the embodiment shown in FIG. 8, the stroke of expansion of the actuator will be somewhat limited. However, this arrangement may be suitable under those conditions in which the displacement of the free end 17 is relatively small.

In a third embodiment the force generating assembly operates on a lever principle by which the limited stroke of an actuator is proportionately magnified for displacement of a mass. Directing attention to FIG. 10, just as with the previous two embodiments, a member 12 having a longitudinal axis 13 is connected at one end to a member holder 14. To the free end 17 of the member 12 is attached an adaptor 46 and to the adaptor is attached a tool head 18 having a cutting element 20 attached thereto. A force generating device 340 is attached to the adaptor 46 and situated within the bore 32 of the member 12.

Focusing now on the force generating device 340, the device is comprised of a sleeve 342 having sleeve walls 344 and a sleeve threaded portion 346 which is attached to a first diameter 48 of the adaptor 46. A lever 347 having a long length end 350, a short length end 352, and a fulcrum 354 therebetween is supported at the fulcrum 354 by a pivot 356 connected to the lever 347 and the sleeve wall 344. Contacting the opposite side of the lever 347 is an actuator 364 which also contacts the sleeve wall 344. When activated, the actuator 364 expands and acts to displace the short length end 352 of the lever 347 thereby causing the long length end 350 to be displaced in the opposite direction but displaced by a proportionately greater amount. A solid mass 348 is secured to the long length end 350 of the lever 347, and as such, activation of the actuator 364 results in displacement of the mass 348 at the long length end 350.

In FIG. 10 the actuator 364 is located at the short length end 352 of the lever 347. This arrangement is preferred when the actuator 364 is a piezoelectric device because of the high force and short stroke inherent in such a device. However, if the actuator is, for example, a DC actuator, which as discussed is the type of device that provides relatively lower force but a longer stroke, then the position of the actuator 364 and the mass 348 may be switched.

Figure 11:
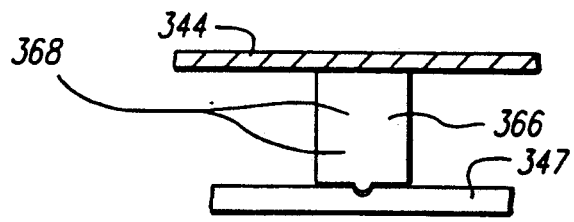
FIG. 11 is a portion of FIG. 10 showing an alternate design for of returning the mass toward the initial position.

In order to return the mass 348 toward its initial position such that the actuator 364 may again be utilized, a spring 358 is compressed between the sleeve wall 344 and the lever 347 at a position on the lever toward the long length end 350. To provide guidance for the spring 358, a screw 360 may be connected to the sleeve wall 344 and the lever 348 as shown in FIG. 10. In lieu of the spring 358 or screw 360, a return actuator 366 (FIG. 11) may be situated between the sleeve 344 and the lever 347 at the position of the spring 358. The actuator 366 may be a cluster of piezoelectric elements, with wires 368, similar to those described earlier.

Just as before, signals from the member sensor 92 and the mass sensor 394 are sent through wires 98 and 300 respectively, to the processor 102 and an activation signal is sent to the actuator 364 through wires 396 and wires 368 to activate the actuator 364, and return actuator 366 if applicable, and provide the necessary displacement of the mass 348 to oppose motion at the free end 17 of the member 12.

Each of the actuators described in FIGS. 2-10 have, when activated, expanded against two opposing surfaces for displacement through compression. Unlike the piezoelectric elements or the other devices so far discussed, there are piezoelectric elements that provide movement along a shear plane. Specifically, there are piezoelectric elements commercially available which operate in a manner other than by compressing two opposing surfaces through expansion of the piezoelectric elements. There are arrangements of piezoelectric elements which operate in shear.

Given a series of piezoelectric elements along a single axis, when activated, these elements will shear transversely and thereby generate a displacement perpendicular to the axial direction. Furthermore, the direction of this displacement may be controlled by the polarity of the current transmitted through the element. Piezoelectric elements of this type are, therefore, capable of displacing a mass in two directions. With this capability incorporated into a force generating device it is possible to design a force generating device without the spring arrangements discussed in previous embodiments.

Directing attention to FIG. 12, another embodiment of the force generating device is shown. Just as before, a member 12 having a longitudinal axis 13 is secured to a member holder 14 at one end. To the free end 17 of the member 12 is attached an adaptor 46 and to the adaptor 46 is attached a tool head 18. A cutting tool 20 is attached to the tool head 18. A bore 32 extends from free end 17 of the member 12 toward the member holder 14.

A force generating device 440 is comprised of a sleeve 442 having a sleeve wall 444 with a sleeve threaded portion 446 which engages with the threaded first diameter 48 of the adaptor 46 such that the sleeve 442 is essentially fixed to the adaptor 46 and to the member 12. The sleeve 442 is closed at the sleeve end 445 and a plug 447 having a threaded diameter 450 engages the sleeve threaded portion 446 of the sleeve 442 to enclose the other end of the sleeve 442. An actuator 464 which, upon activation provides a displacement along the transverse axis 30, is attached to the sleeve 442 at the sleeve end 445 and also attached to a mass 448. A second actuator 465 secured to the plug 447 is also attached to the mass 448.

Because actuator 464 and actuator 465 are both capable of lateral displacement in both directions along the transverse axis 30, as mentioned before, there is no need to provide a mechanical spring to return the mass 448 toward its initial position. However a spring may be included in order to increase the natural frequency of the system. A sensor 494 may be mounted within the mass 448 to detect motion along the transverse axis 30. Furthermore, a sensor 92 is mounted within the member 12 to detect motion at the free end 17 of the member 12 along the transverse axis 30. Sensor 92 and sensor 494 provide signals via wires 98 and 400 respectively to the processor 102 which, in turn, provides an actuation signal to the actuators 464 and 465 to displace the mass 448 along the transverse axis 30.

It should be noted both actuators 464 and 465 act in a coordinated fashion such that each actuator displaces the mass 448 in the same direction at the same time. The physical attachment of the actuators 464 and 465 to the mass 448 and to the plug 447 and the sleeve end 446 may be accomplished using conventional techniques, such as, through the use of epoxy, or through the use of mechanical fasteners such as screws.

What has been described in these four embodiments are different force generating devices 140, 240, 340 and 440, which are all fastened to an adaptor 46 at the free end 17 of the member 12. It is entirely possible to provide a force generating assembly that can be secured to the member at the bore rearward portion 36. For example, examining the force generating assembly 440 in FIG. 12, the sleeve 442 could be physically secured to the member 12 in the bore rearward portion 36. One possible way to accomplish this, as shown in FIG. 13, would be to provide a threaded portion 500 extending from the member 12 in the bar rearward portion 36 to which the sleeve threaded portion 446 could be secured. In such a fashion, the adaptor 46 (FIG. 12) could be eliminated and the tool head 18 could be secured directly to the free end 17 of the member 12 using, for example, screws 510.

Furthermore the sleeve utilized for the force generating assemblies 240, 340 and 440 may be used as an extension of the member 12. As shown in FIG. 14, the sleeve 542 is attached to and extends from a threaded portion 600 of the member 12. In this manner the tool head 18 with cutting element 20 attached thereto could be secured to the sleeve 542 using, for example, screw 610 and there would be no need for a bore within the member 12. In the alternative it should be appreciated that the bore within the member 12 could function as the sleeve 542 now does and as such the separate sleeve 54 could be eliminated and the force generating assembly could be secured directly within the bore, such as bore 32 in FIG. 12, of the member 12. This arrangement would be similar to that shown in FIG. 14 except the sleeve 542 would be an integral part of the member 12.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form herein before described being merely preferred or exemplary embodiments thereof.

What is claimed is:

1. Apparatus for actively controlling vibration in a cantilevered member having a longitudinal axis comprising:
   a) a sensor mounted near the free end of the member to measure motion of the member in a transverse direction and to produce a corresponding signal;
   b) a force generating assembly mounted to the member near the free end to oppose the measured motion with a force thereby minimizing subsequent motion along the transverse axis caused by vibration, said assembly comprised of:
      i) a solid mass attached to the member near the free end and displaceable from an initial position such that when displaced the resulting acceleration of the mass generates a force upon the member;
      ii) an actuator to act upon and displace the mass from the initial position;
      iii) means for receiving and interpreting the sensor signal and activating the actuator to displace the mass at an acceleration which is a function of the sensor signal; and
      iv) means for returning the mass toward the initial position.

2. The apparatus according to claim 1 wherein the member has a longitudinal bore therein with a forward and rearward portion and wherein the mass is movably attached to the member through a base secured within the bore to the member and a hinge with a pivot having an axis perpendicular to the plane defined by the intersection of the transverse axis and the longitudinal axis, said hinge connecting the mass to the base and positioning the mass within the bore.

3. The apparatus according to claim 2 wherein the actuator is a piezoelectric device aligned to change in length in the longitudinal direction with the application of voltage.

4. The apparatus according to claim 3 wherein the actuator is positioned between the base and the mass at a point away from the hinge axis such that activation of the actuator causes the mass to pivot about the hinge axis, thereby generating an acceleration and associated force.

5. The apparatus according to claim 3 wherein the means for returning the mass toward the initial position is comprised of at least one spring-loaded bolt securing the mass to the base at a location away from the hinge and biased opposite the direction of the actuator expansion.

6. The apparatus according to claim 3 wherein the means for returning the mass toward the initial position is comprised of a spring extending from the member within the bore to the mass at a location away from the hinge axis and biased opposite the direction of the actuator expansion.

7. The apparatus according to claim 3 wherein the means for returning the mass toward the initial position is a return actuator comprised of a piezoelectric device aligned to expand, with the application of voltage, in the longitudinal direction opposite that of the actuator cluster of piezoelectric elements, said return actuator contacting the member within the bore of the member and contacting the mass.

8. The apparatus according to claim 2 wherein the actuator is a DC linear brushless motor aligned to displace in the longitudinal direction with the application of voltage.

9. The apparatus according to claim 2 wherein the sensor is an accelerometer.

10. The apparatus according to claim 9 further including a sensor mounted to the mass and wherein such sensor is an accelerometer.

11. The apparatus according to claim 2 wherein the hinge is made of an elastic material.

12. The apparatus according to claim 2 wherein the cantilevered member is a boring bar with a cutting element mounted to a tool head which is attached to the free end of the boring bar and vibration is caused by the oscillating interaction forces between the cutting element and a workpiece.

13. The apparatus according to claim 2 wherein the cantilevered member is a vertical turning lathe with a cutting element mounted to a tool head which is attached to the free end of the lathe and vibration is caused by the oscillating interaction forces between the cutting element and a workpiece.

14. The apparatus according to claim 2 wherein the cantilevered member is a horizontal boring mill with a cutting element mounted to a tool head which is attached to the free end of the mill and vibration is caused by the oscillating interaction forces between the cutting element and a workpiece.

15. The apparatus according to claim 1 wherein the member further includes a sleeve having a wall and wherein the mass is slidingly mounted within the sleeve for movement along the transverse axis.

16. The apparatus according to claim 15 wherein the actuator is positioned along the transverse axis within the sleeve between the sleeve wall and the mass such that activation of the actuator causes the mass to displace along the transverse axis, thereby generating an acceleration and associated force.

17. The apparatus according to claim 16 wherein the actuator is a piezoelectric device aligned to expand in the transverse direction with the application of voltage.

18. The apparatus according to claim 17 wherein the means for returning the mass toward the initial position is comprised of at least one spring oriented along the transverse axis positioned between and contacting the mass and the sleeve wall and biased opposite the direction of the actuator expansion.

19. The apparatus according to claim 17 wherein the means for returning the mass toward the initial position is comprised of at least one spring-loaded bolt securing the mass to the sleeve and biased opposite the direction of the actuator expansion.

20. The apparatus according to claim 17 wherein the means for returning the mass toward the initial position is a return actuator comprised of a piezoelectric device aligned to expand in the transverse direction opposite the direction of the actuator expansion, said return cluster contacting the sleeve and contacting the mass.

21. The apparatus according to claim 16 wherein the actuator is a DC linear brushless motor aligned to expand in the transverse direction with the application of voltage.

22. The apparatus according to claim 16 wherein the sensor is an accelerometer.

23. The apparatus according to claim 22 further including a sensor mounted to the mass and wherein such sensor is an accelerometer.

24. The apparatus according to claim 16 wherein the cantilevered member is a boring bar with a cutting element mounted to a tool head which is attached to the free end of the boring bar and vibration is caused by the oscillating interaction forces between the cutting element and a workpiece.

25. The apparatus according to claim 16 wherein the cantilevered member is a vertical turning lathe with a cutting element mounted to a tool head which is attached to the free end of the lathe and vibration is caused by the oscillating interaction forces between the cutting element and a workpiece.

26. The apparatus according to claim 16 wherein the cantilevered member is a horizontal boring mill with a cutting element mounted to a tool head which is attached to the free end of the mill and vibration is caused by the oscillating interaction forces between the cutting element and a workpiece.

27. The apparatus according to claim 1 wherein the member further includes a sleeve having a wall and wherein the mass is movably attached to the sleeve, said sleeve having a lever with a short length end and a long length end on each side of a fulcrum, said lever pivotally attached at the fulcrum to the sleeve wall, and wherein mass is secured to the long length end of the lever such that a small displacement at the short length end will result in a magnified displacement at the long length end.

28. The apparatus according to claim 27 wherein the actuator is a piezoelectric device aligned to expand in the transverse direction with the application of voltage.

29. The apparatus according to claim 28 wherein the actuator is positioned along the transverse axis within the sleeve between the sleeve wall and the mass such that activation of the actuator causes the mass to displace along the transverse axis, thereby generating an acceleration and associated force.

30. The apparatus according to claim 28 wherein the means for returning the mass toward the initial position is comprised of at least one spring oriented along the transverse axis positioned between and contacting the lever toward the long length end and the sleeve wall and biased opposite the direction of the actuator expansion.

31. The apparatus according to claim 28 wherein the means for returning the mass toward the initial position is comprised of at least one spring-loaded bolt securing the lever toward the long length end to the sleeve and biased opposite the direction of the actuator expansion.

32. The apparatus according to claim 28 wherein the means for returning the mass toward the initial position is a return actuator comprised of a piezoelectric device aligned to expand in the transverse direction opposite the direction of the actuator expansion, said return actuator contacting the sleeve and contacting the lever toward the long length end.

33. The apparatus according to claim 27 wherein the actuator is a DC linear brushless motor aligned to displace in the longitudinal direction with the application of voltage.

34. The apparatus according to claim 27 wherein the sensor is an accelerometer.

35. The apparatus according to claim 34 further including a sensor mounted to the mass and wherein such sensor is an accelerometer.

36. The apparatus according to claim 27 wherein the cantilevered member is a boring bar with a cutting element mounted to a tool head which is attached to the free end of the boring bar and vibration is caused by the oscillating interaction forces between the cutting element and a workpiece.

37. The apparatus according to claim 27 wherein the cantilevered member is a vertical turning lathe with a cutting element mounted to a tool head which is attached to the free end of the lathe and vibration is caused by the oscillating interaction forces between the cutting element and a workpiece.

38. The apparatus according to claim 27 wherein the cantilevered member is a horizontal boring mill with a cutting element mounted to a tool head which is attached to the free end of the mill and vibration is caused by the oscillating interaction forces between the cutting element and a workpiece.

39. The apparatus according to claim 1 wherein the member further includes a sleeve having a wall and wherein the mass is movably attached to the sleeve and at least one double acting transverse actuator is mounted along the longitudinal axis to the sleeve such that said actuator when activated by a voltage causes the mass to be displaced along the transverse axis, thereby generating an acceleration and associated force and when activated by an opposite voltage causes the mass to be displaced in an opposite direction.

40. The apparatus according to claim 39 wherein the at least one double acting transverse actuator comprises a second actuator attached to the sleeve by a plug secured within the sleeve and attached to the mass.

41. The apparatus according to claim 40 wherein the actuator is a piezoelectric device aligned to expand in the transverse direction with the application of voltage.

42. The apparatus according to claim 40 wherein the means for returning the mass toward the initial position is the at least one double acting transverse actuator.

43. The apparatus according to claim 39 wherein the sensor is an accelerometer.

44. The apparatus according to claim 43 further including a sensor mounted to the mass and wherein such sensor is an accelerometer.

45. The apparatus according to claim 39 wherein the cantilevered member is a boring bar with a cutting element mounted to a tool head which is attached to the free end of the boring bar and vibration is caused by the oscillating interaction forces between the cutting element and a workpiece.

46. The apparatus according to claim 39 wherein the cantilevered member is a vertical turning lathe with a cutting element mounted to a tool head which is attached to the free end of the lathe and vibration is caused by the oscillating interaction forces between the cutting element and a workpiece.

47. The apparatus according to claim 39 wherein the cantilevered member is a horizontal boring mill with a cutting element mounted to a tool head which is attached to the free end of the mill and vibration is caused by the oscillating interaction forces between the cutting element and a workpiece.

48. A method for actively controlling vibration in a cantilevered member having a longitudinal axis comprising the steps of:
   a) sensing motion in a transverse direction near the free end of the member and producing a corresponding signal;
   b) generating a force along the transverse axis near the free end to oppose the measured motion, wherein generating a force comprises the steps of:
      i) attaching a mass to the member near the free end, said mass being displaceable along the transverse axis from an initial position such that when displaced the resulting acceleration of the mass generates a force upon the member;
      ii) receiving and interpreting the corresponding signal;
      iii) displacing the mass a desired amount at a desired rate; and
      iv) returning the mass toward the initial position.

* * * * *